Sept. 25, 1951 C. W. EARP ET AL 2,568,724

ELECTRIC PULSE CODE MODULATION SYSTEM OF COMMUNICATION

Filed Feb. 10, 1949 3 Sheets-Sheet 1

INVENTORS
CHARLES WILLIAM EARP
MALCOLM FRANK WINTLE
BY R. P. Morris
ATTORNEY

ELECTRIC PULSE CODE MODULATION SYSTEM OF COMMUNICATION

Filed Feb. 10, 1949 3 Sheets-Sheet 2

INVENTORS
CHARLES WILLIAM EARP
MALCOLM FRANK WINTLE
BY
ATTORNEY

ELECTRIC PULSE CODE MODULATION SYSTEM OF COMMUNICATION

INVENTORS
CHARLES WILLIAM EARP
MALCOLM FRANK WINTLE
BY R. P. Morris
ATTORNEY

Patented Sept. 25, 1951 2,568,724

UNITED STATES PATENT OFFICE 2,568,724

ELECTRIC PULSE CODE MODULATION SYSTEM OF COMMUNICATION

Charles William Earp and Malcolm Frank Wintle, London, England, assignors to International Standard Electric Corporation, New York, N. Y., a corporation of Delaware Application February 10, 1949, Serial No. 75,533
In Great Britain February 20, 1948

9 Claims. (Cl. 332—9)

The present invention relates to electric pulse code modulation systems of communication, of the kind described in Reeves United States Patent Specification No. 2,272,070.

The invention relates to a pulse code modulation system in which a binary code is used for expressing the signal amplitudes. In this system, the signal amplitude at each of a sufficient number of instants is determined according to a scale having a finite number of steps, and the nearest scale value is expressed by a code in which at each of a specified number of instants in each code group, a pulse may be present or absent. If there are $m$ such instants, then the number of scale values which can be expressed is $s=2^m$.

The amplitude scale can be expressed by this code in a number of different ways, and in one commonly used form of the binary code, the step number of the amplitude scale is given by $a_r2^r$, where $r$ may be zero, or may have any integral value from 1 to $m-1$, and $a_r$ is 1 or zero according as a pulse is present or absent in the corresponding code interval. This type of binary code is called for convenience the "simple addition" binary code. Another type of binary code known as the "staggered step binary code" is described in the specification of our co-pending application Ser. No. 75,532, filed February 10, 1949, for "Electric Pulse Code Modulation Systems of Communication."

When $m=5$, a five-unit code results, which is capable of expressing 32 amplitude steps.

The principal object of the present invention is to provide an arrangement for coding signal waves according to the simple addition binary code.

Attention may be drawn to the specification of our co-pending application Ser. No. 75,534, filed February 10, 1949, for "Electric Pulse Code Modulation Systems of Communication" which cover two other different arrangements for coding the signal amplitudes according to the simple addition code.

The present invention provides an electric pulse code modulator comprising a periodically operating counting device arranged to build up a potential wave, the amplitude of which changes progressively in discrete steps, means for comparing the potential wave with a signal wave potential, means for stopping the operation of the counting device when the difference of the two wave potentials has reached a specified value, and means for deriving from the counting device a distribution of potentials characteristic of the instantaneous signal amplitude.

The invention will be illustrated by a multichannel pulse transmitter which employs a modulator according to the invention. This embodiment will be described with reference to the accompanying drawings, in which.

Figure 1:
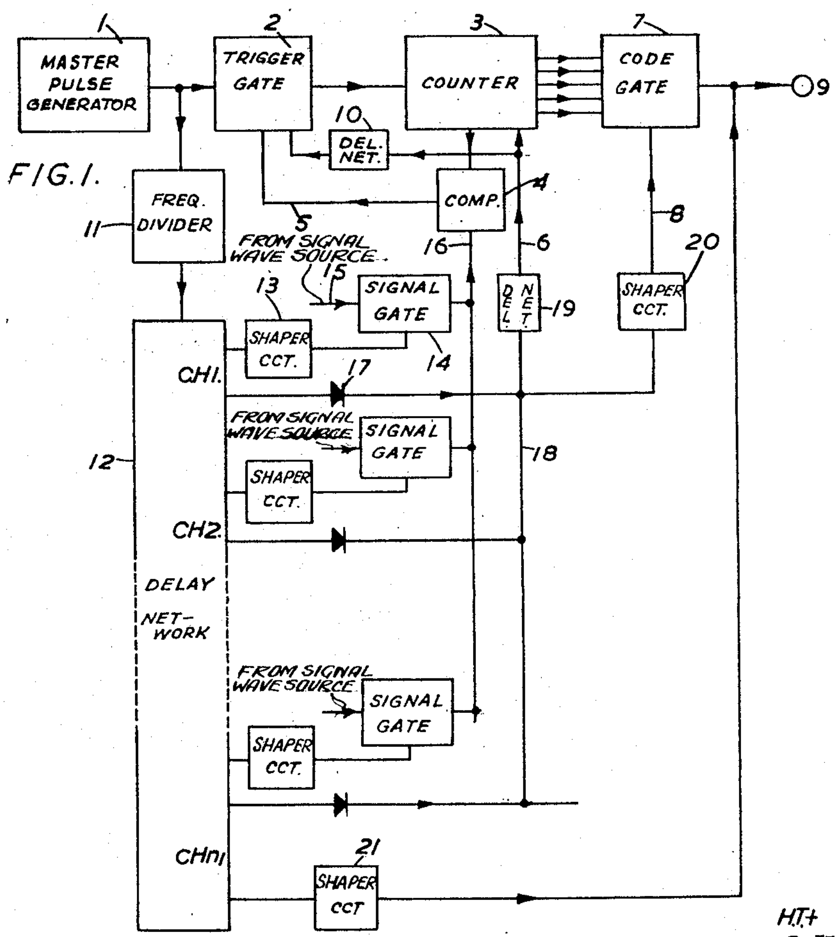
Fig. 1 shows a block schematic circuit diagram of the multichannel pulse transmitter.

The multichannel communication system employed to illustrate the invention will be assumed to have $n$ channels, and that for each channel, the amplitude of the signal wave is determined and coded $f$ times per second where $f$ is at least twice the highest frequency in the signal band. In Fig. 1 the code modulating arrangement which is common to all channels, comprises a master pulse generator 1 which supplies short positive trigger pulses at a frequency of F pulses per second through a trigger gate circuit 2 to a counter circuit 3 having $m$ stages, where $m$ is the number of units in the binary code employed. The frequency F should be equal to $fsn$.

Figure 2:
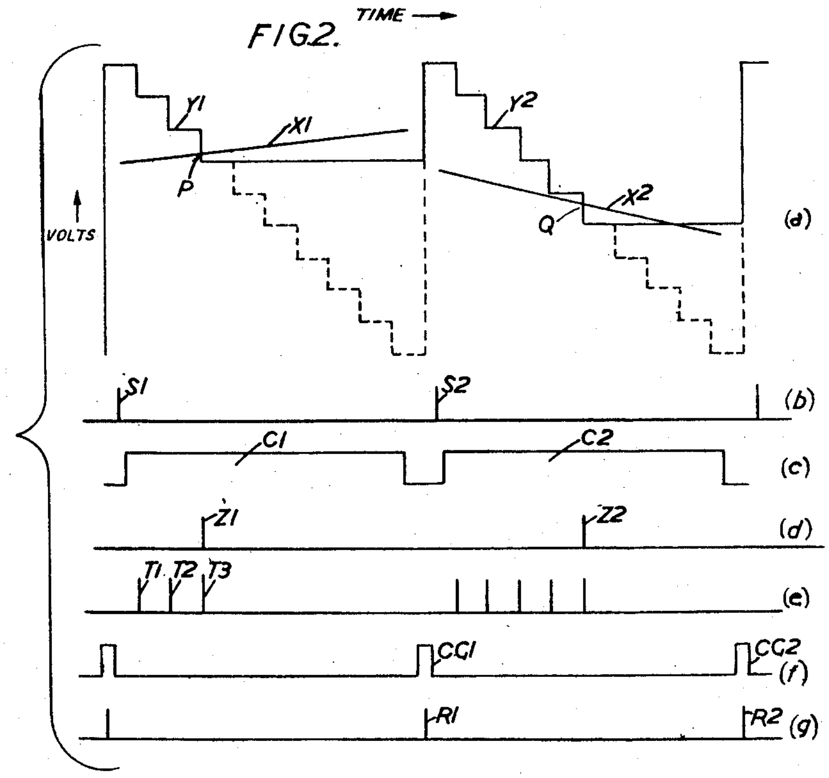
Fig. 2 shows graphical diagrams used to explain the operation of the transmitter.

The counter circuit is arranged to build up periodically a comparison voltage wave the amplitude of which changes in equal steps as shown in Fig. 2, curve (*a*), in which the abscissa represents time and the ordinate represents voltage.

With this is combined a voltage derived from the signal wave and the combined voltage is applied to a comparator circuit 4 which is arranged to produce a pulse which is supplied over conductor 5 to shut the trigger gate circuit 2 and thus to stop the counter circuit 3, which then remains with some stages normal and others operated. At a time just after the counter would have completed one count if it had not been stopped, a restoring pulse is supplied, to the counter circuit 3 over conductor 6, and returns to normal all the operated stages of the counter. Each of these stages in returning to normal generates a code pulse which is supplied over a corresponding conductor to a code gate circuit 7 to which is also supplied a gating pulse over conductor 8 enabling it to accept the code pulses when they are produced. This code gate circuit is arranged to supply the code pulses in any desired order in time to the output terminal 9 which is connected to the line or other communication medium over which the code pulses are to be transmitted.

Shortly after the counter circuit 3 has been restored to normal a starting pulse derived from the restoring pulse in conductor 6 is applied over delay network 10 to open the trigger gate again, thus starting a new counting operation. The operation of the counter circuit 3 and the associated elements will be explained in more detail later.

The master pulse generator 1 supplies the trigger pulses also to a frequency divider 11 which divides by *sn*, so that positive pulses at the channel frequency *f* are supplied to a delay network 12 (or other suitable pulse distributor). A gating pulse for channel 1 is derived from a suitable tapping point on the delay network, and after being suitably lengthened in the shaping circuit 13 is applied to the signal gate circuit 14 for channel 1, to which the signal wave is also applied at terminal 15. The portion of the signal wave passed by the gate circuit is applied to a common conductor 16 connected to the comparator circuit 4. The restoring pulse mentioned above is obtained from a slightly later tapping of the delay network 12 and is passed through a rectifier 17 to a common conductor 18 which is connected through a delay network 19 to a conductor 6, and through a shaping circuit 20 to conductor 8. The shaping circuit is intended to lengthen the trigger pulse slightly to produce the gating pulse for the code gate circuit 7 and the delay network 19 delays it slightly to give time for the code gate to be opened to accept the code pulses produced on the restoration of the counter circuit. As will be explained later, negative gating pulses are required for operating the code gate circuit, so the shaping device 20 should include suitable means for inverting the pulses.

The apparatus for channel 2 is arranged in the same way, but is connected to a pair of later tappings on the delay network 12. Only the apparatus for the last of the remaining channels is shown. All the channels are arranged in the same way, and the signal gates are merely connected to progressively later tappings on the delay network 12.

A synchronising pulse may be obtained from a shaping circuit 21 connected to an appropriate tapping on the delay network. The output of the shaping circuit is connected to terminal 9.

Figure 3:
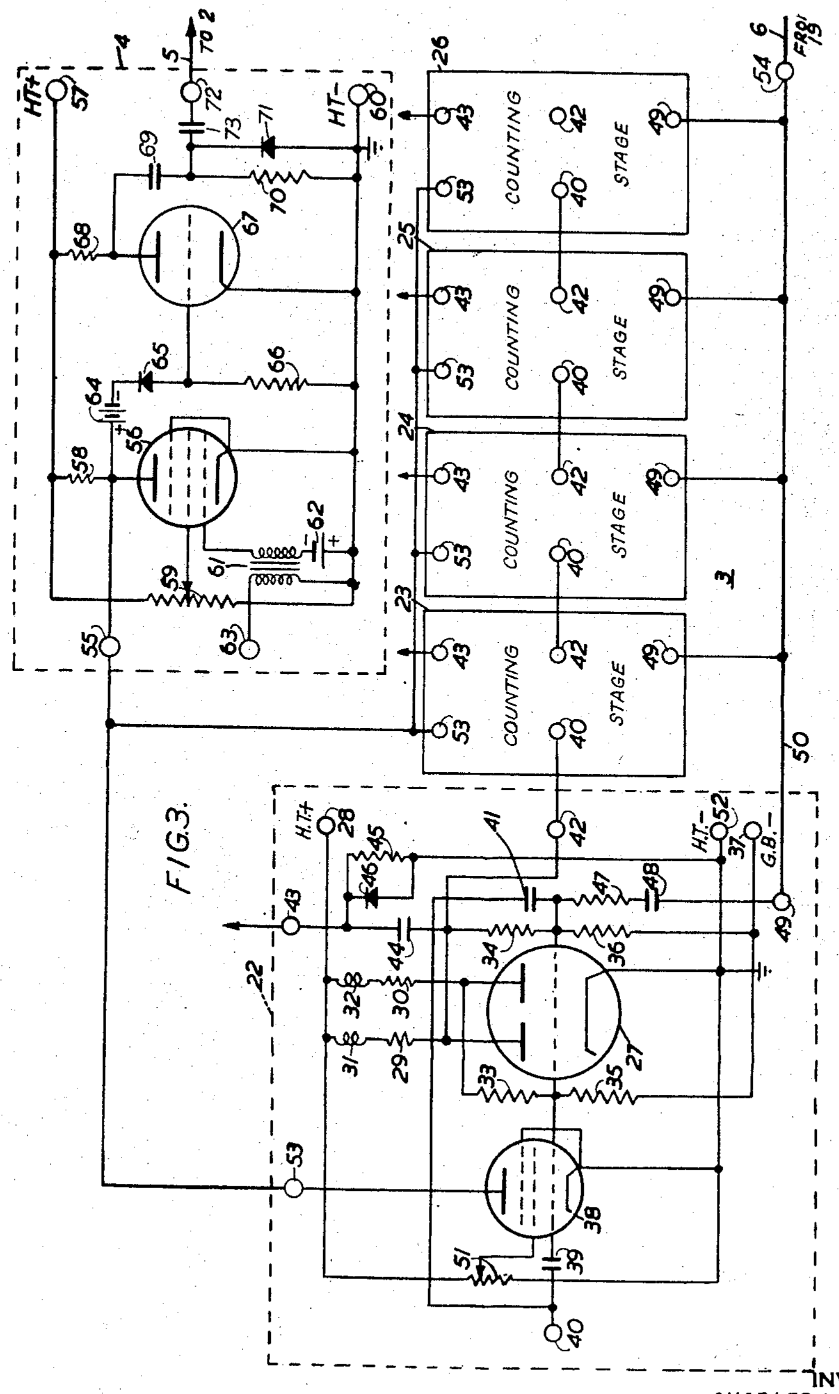
Fig. 3 shows circuit details of the counter circuit and comparator of Fig. 1.

Fig. 3 shows details of the counter circuit 3 and the comparator circuit 4. It is assumed that a five unit code is used, so that the counter circuit has five identical counting stages 22, 23, 24, 25 and 26, of which details of the stage 22 only are shown. This stage comprises a double triode valve 27 arranged as a conventional multivibrator (Eccles-Jordan trigger circuit) which is stable in both conditions. The anodes are connected to the positive terminal 28 for the high tension source (not shown) through equal load resistances 29 and 30 and high frequency choke coils 31 and 32. The anodes are also connected to the opposite control grids through equal resistances 33 and 34, these grids being connected through resistances 35 and 36 to a terminal 37 for a negative grid bias source.

The left hand control grid is connected to the control grid of a pentode valve 38 and also through a blocking condenser 39 to an input terminal 40 to which the output of the gating circuit 2 of Fig. 1 will be connected. Terminal 40 is also connected through another blocking condenser 41 to the right hand control grid. The left hand anode is connected to an output terminal 42, and also to a second output terminal 43 through a differentiating circuit comprising the condenser 44 and resistance 45 shunted by the rectifier 46 directed so that it suppresses the negative differentiated pulses.

The right hand control grid is also connected through a resistance 47 and blocking condenser 48 to an input terminal 49 to which the restoration pulses are supplied over conductor 50.

The pentode valve 38 should be arranged so that the anode current is substantially independent of the anode voltage. The screen grid is connected to the movable contact of a potentiometer 51 connected between terminal 28 and the grounded high tension negative terminal 52. The anode is connected to a terminal 53.

The input terminal 40 of each of the remaining counting stages 23 to 26 is connected directly to the output terminal 42 of the preceding stage as shown. All the input terminals 49 are connected in parallel to conductor 50, and thence to a terminal 54 to which the delay network 19 (Fig. 1) is connected. All the terminals 53 are connected in parallel to the input terminal 55 of the comparator circuit 4. The five output terminals 43 will be connected over five separate conductors to the code gate circuit 7 (Fig. 1).

The comparator circuit 4 includes a pentode valve 56 having its anode connected to the positive high tension terminal 57 through a load resistance 58. The screen grid is connected to the movable contact of the potentiometer 59, connected between terminal 57 and the grounded negative high tensions terminals 60. The control grid is connected to ground through the secondary winding of the signal input transformer 61, and through a negative grid bias source 62. The signal input terminal 63 is connected to ground through the primary winding of the transformer 61. The common output conductor 16 of the signal gate circuits 14 (Fig. 1) will be connected to terminal 63.

The anode of the valve 56 is connected to the positive terminal of a comparison voltage source 64, the negative terminal of which is connected to the cathode of a rectifier 65, the anode of which is connected to ground through a resistance 66. The anode of the rectifier is also connected to the control grid of a reversing valve 67, the anode of which is connected through a load resistance 68 to terminal 57. The anode of this valve is also connected to a differentiating circuit 69, 70 the rectifier 71 being provided to suppress the negative differential pulses. An output terminal 72 is connected to the differentiating circuit through a blocking condenser 73. The counter stopping pulse is obtained from terminal 72 which will be connected over conductor 5 (Fig. 1) to the trigger gate circuit 2.

The counter stages should be biassed in such manner that the control grids are sensitive to positive pulses but not to negative pulses, so that a negative pulse will not be able to cut off a conducting section of the valve. Alternatively a rectifier (not shown) may be connected between the anode and the terminal 42 directed so that it blocks negative pulses. The arrangement should preferably be such that when one section is conducting the corresponding control grid is at above zero potential.

The normal or unoperated condition of each counting stage will be taken to be that in which the left hand section of the valve is cut off, while the right hand section is conducting. Assuming that the trigger gate circuit 2 (Fig. 1) is open, the trigger pulses from the generator 1 will reach terminal 40. The first of these pulses will switch over the valve 27 in the first stage, transmitting a negative pulse to the second stage 23, which has no effect. The second trigger pulse restores the first stage to the normal condition and transmits a positive pulse to the second stage 23 which switches it over, and so on. The remaining stages operate in the same way. It will be clear, therefore, that stage 22 switches over on every pulse, whilst stages 23, 24, 25 and 26 switch over on every 2nd, 4th, 8th, and 16th, pulses respectively.

It will be noted that the pentode valves 38 of the five counter stages share the load resistance 58 with the pentode valve 56 of the comparator circuit. As already stated all these valves should be arranged so that anode current is independent of the anode voltage.

It will be noted also that since the control grid of the valve 38 is connected directly to the control grid of the left hand half of the valve 27, the valve 38 will be cut off when the corresponding counting stage is in the normal condition, so that the anode current is zero. When the counting stage is operated, the pentode 38 will be conducting, and the screen grid potential should be adjusted by means of the potentiometer 51 so that the anode current is then proportional to $2^{m-1}$ for counting stage $m$ as numbered from the left hand side of Fig. 3. Thus in the case of the five unit code, the currents for the five pentodes of the stages 22 to 26 could be, for example, 1, 2, 4, 8 and 16 milliamperes respectively. If the resistance 58 is for example, 1000 ohms, then it will be clear that as the counting stages are operated by 31 successive trigger pulses, the potential drop in the resistance 58 will increase in 31 steps of 1 volt from zero to 31 volts. The 32nd trigger pulse will restore all stages to normal, and the potential drop will return to zero.

It will be clear, therefore, that the potential of the anode of the valve 56 will fall in steps of 1 volt from the potential of the high tension source (for example, 300 volts) to 269 volts, in the manner shown at Y1 and Y2 in curve (*a*) of Fig. 2. Actually only ten steps are shown for clearness instead of 32.

The anode current of the valve 56 should be adjusted by means of the potentiometer 59 so that with zero applied signal voltage it has a value of, for example, about 20.5 milliamps, which is a little in excess of the mean current produced by the counter stages through terminals 53. The signal potential applied to the control grid of the valve 56 should then be so proportioned in any convenient way that it produces an equivalent anode current variation from the mean of $\pm 15.5$ milliamperes. The valve 56 will then provide a voltage drop in the resistance 58 which varies according to the signal between the limits 5 and 36 volts The potential of the comparison source 64 should be chosen to be equal to the mean total anode potential of the valve 56 when the applied signal potential is zero. Thus, using the values given above, it will be clear that the potential of the comparison source should be $$300-20.5-15.5=264 \text{ volts.}$$

As the counter generates the stepped wave indicated in curve (*a*) Fig. 2, the rectifier 65 will block until the anode potential falls below 264 volts, and then the rectifier conducts and applies a negative pulse to the control grid of the valve 67. The valve 67 produces a positive differential stopping pulse which shuts the trigger gate 2 and stops the counter at the point which it had reached.

It will be clear that the effect of the signal potential is to move the stepped curves up and down with respect to the comparison potential. Alternatively the comparison potential may be regarded as varying with respect to the stepped wave in the inverse manner as indicated for example by the lines X1 and X2 in curve (*a*) of Fig. 2. The counter will evidently be stopped at the points P and Q where the curves X1 and X2 cross the stepped waves Y1 and Y2.

It is assumed that signal gate circuits 14 of Fig. 1 will invert the signals, but whether this is so or not is immaterial since the transformer 61 in Fig. 3 can be poled so that the top quantising level corresponds to maximum positive or maximum negative signal amplitude, as desired.

Figure 4:
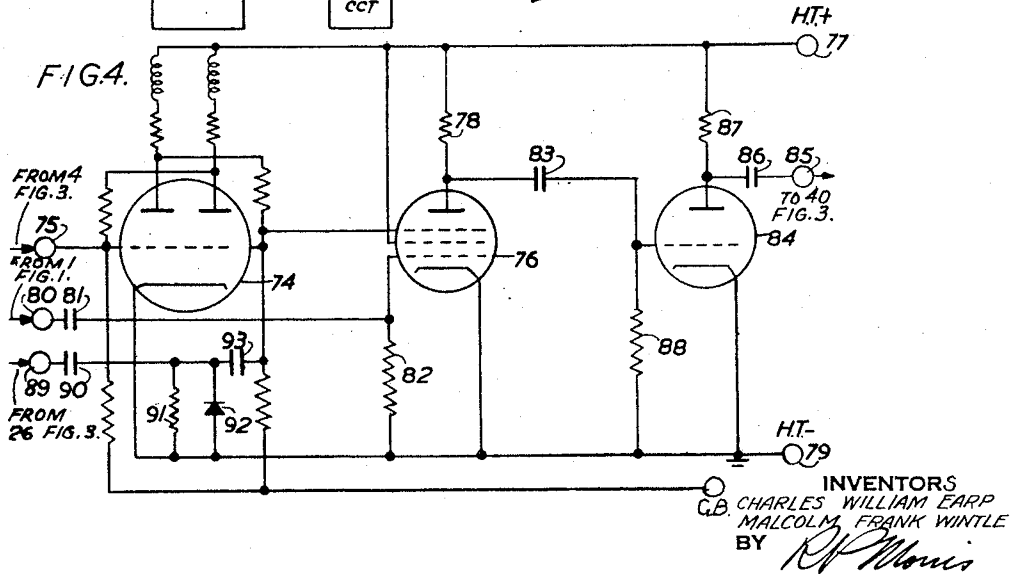
Fig. 4 shows circuit details of the trigger gate circuit.

Fig. 4 shows details of the trigger gate circuit 2 of Fig. 1. It comprises a double triode valve 74 arranged in the same way as the valve 27 of Fig. 3 to form a double stable multivibrator. The normal condition (gate open) is in this case that in which the left hand section of the valve 74 is cut off. The positive stopping pulses are applied from terminal 72 of the comparator 4 (Fig. 3) to the input terminal 75 (Fig. 4) which is connected to the left hand control grid. The right hand control grid is connected to the suppressor grid of a pentode gating valve 76 arranged with the anode connected to the positive high tension terminal 77 through a resistance 78. The corresponding grounded negative terminal of the source is 79. The trigger pulses from the master pulse generator 1 are applied to the input terminal 80 which is connected to the control grid of the gating valve 76 through a blocking condenser 81 the usual leak resistance 82 being provided. Assuming that the valve 74 is in the normal condition with the left hand section cut off, the right hand control grid will be at somewhere about zero potential, so that the valve 76 will be unblocked and the trigger pulses will be allowed to pass and will be obtained as negative pulses from the anode. These pulses are applied through a blocking condenser 83 to the control grid of an inverting valve 84, from the anode of which positive trigger pulses are obtained at the output terminal 85 connected to the anode through a blocking condenser 86. This output terminal will be connected to terminal 40 of the stage 22 in Fig. 3.

The inverting valve 84 is provided with the usual anode load resistances 87 and grid leak resistance 88.

When a positive stopping pulse is received at terminal 75 (Fig. 4) the valve 74 will be switched over so that the right-hand section is cut off. The right hand grid potential falls, to a relatively large negative potential and cuts off the gating valve 76 so that the trigger pulses are prevented from reaching the counter circuit, Fig. 3.

A starting pulse, obtained by delaying the restoring pulse on conductor 6 (Fig. 1) in delay network 10, is applied to a terminal 89 which is connected to a differentiating circuit comprising the condenser 90 and resistance 91, and rectifier 92 provided to suppress the negative differentiated pulse. The positive differential pulse is applied to the right hand control grid of the valve 74 through a blocking condenser 93, and restores the valve to the normal condition, thus unblocking the gating valve 76 and permitting the trigger pulses again to reach the counter circuit.

Figure 5:
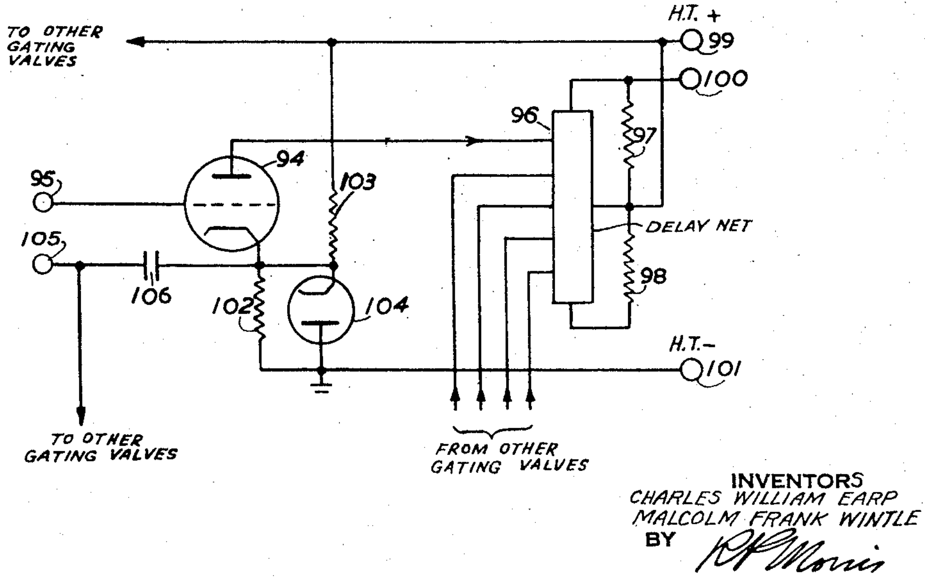
Fig. 5 shows circuit details of the code gate circuit.

Details of the code gate circuit 7 of Fig. 1, are shown in Fig. 5. It comprises five similarly arranged gating valves of which only one is shown, designated 94. Five input terminals are connected respectively to the control grids of the valves. One of these is designated 95. These five input terminals will be connected respectively to the five output terminals 43 of the five counting stages 22 to 26 of Fig. 3.

The anode of the valve 94 is connected to a tapping on a delay network 96 the anodes of the other gating valves (not shown) being connected to other tappings as indicated. The delay network is correctly terminated at either end by resistances 97 and 98 provided to prevent reflections. The positive terminal 99 for the high tension source is connected to all the anodes through the delay network as indicated. One end of the delay network is connected to an output terminal 100.

The cathode of the valve 94 is connected to the grounded negative high tension terminal 101 through a resistance 102 and through another resistance 103 to terminal 99. The resistance 102 is shunted by a diode 104 having its anode connected to ground. A terminal 105 is connected to the cathodes of all the gating valves through individual blocking condensers 106. Conductor 8 from the output of the shaping circuit 20 (Fig. 1) will be connected to terminal 105 (Fig. 5).

The cathode bias of the valve 94 should be adjusted so that the valve is cut off, thus preventing any pulses from passing through. The negative gating pulses obtained from the inverting device contained in the shaping circuit 20 (Fig. 1) should be designed so that each of them substantially annuls the cathode bias thus allowing the passage to the delay network 96 of the code pulse generated when the corresponding counting stage is restored to normal by the restoring pulse supplied to the counter circuit 3 over conductor 6. (Fig. 1.)

The diode 104 is not essential but it is useful to prevent the cathode of the valve 94 from becoming negative, which might result in the production of grid current which would undesirably load the output of the counter stage.

The tappings on the delay network 96 will be chosen so that the code pulses are delivered to the output terminal 100 in succession at any desired time intervals and in any desired order.

Having described the various circuits shown in Fig. 1, the timing arrangements will be briefly explained.

Referring to Fig. 2 curve (*a*) shows the form of two stepped voltage waves Y1 and Y2 produced by the counters shown in Fig. 3. For clearness the wave is shown with only ten steps, but it will be understood that the operation is similar with any number of steps. Curve (*b*) shows the starting pulses applied to open the trigger gate circuit 2 (Fig. 1). One of these is shown at S1 occurring very shortly after one of the trigger pulses applied to the input of the gate circuit 2. The trigger pulses then start the operation of the counters to produce the stepped wave Y1. Shortly after the pulse S1, but before the arrival of the next trigger pulse the leading edge of the signal gating pulse C1 for channel 1 occurs, as shown in curve (*c*). The signal voltage for channel 1 is such that the corresponding curve X1 (Fig. 2, (*a*)) cuts the curve Y1 at the third step. A stopping pulse $Z_1$, curve (*d*) is thus produced, substantially coinciding with this step. The counter stops and the output voltage then remains constant as indicated by the full line instead of continuing to reduce in steps as indicated by the dotted lines which it would have followed if the counter had not been stopped. It will thus be clear than only three trigger pulses as shown at T1, T2, and T3 curve (*e*), can reach the counter 3.

Just after the counter would have taken the last downward step if not stopped, the trailing edge of the pulse C1 occurs, thus cutting off the channel 1 signal voltage. The leading edge of the code gating pulse CG1, curve (*f*), follows after the trailing edge of the signal gating pulse C1 and the pulse CG1 should be long enough to overlap the time when the counter 3 would have taken the final upward step which would restore the output voltage to the maximum value, if it had not been stopped. However, at substantially this time, the restoring pulse R1 shown in curve (*g*) is applied to the counter 3 and restores it to normal. The restoring pulse R1 thus occurs during the period of the code gating pulse CG1, so that the code pulses are delivered to the output terminal 9, (Fig. 1).

Between the trailing edge of the code gating pulse CG1 and the leading edge of the next signal gating pulse C2, curve (*c*), for channel 2, occurs the second starting pulse S2 curve (*b*). The operation is now repeated except that the signal voltage curve X2 now in general crosses a different downward step of the curve Y2 shown, for example, as the fifth step. The stopping pulse $Z_2$ therefore occurs later, and five trigger pulses are allowed to reach the counter 3 instead of only three. The second restoring pulse R2 which occurs during the period of the second code gating pulse OG2, then restores the circuit for the third channel, and so on.

It will be understood that the timing relations which have been explained with reference to Fig. 2 can be obtained by suitable design of the delay networks 10 and 19 (Fig. 1) choice of the tapping points on the delay network 12, and design of the shaping circuits 13 and 20.

Any suitable arrangement may be used at the receiver for separating the pulse code groups corresponding to the various channels and for separately decoding them. An example of such an arrangement is given in the specification of our co-pending application Ser. No. 75,534, filed February 10, 1949, for "Electric Pulse Code Modulation Systems of Communication, already referred to.

While the principles of the invention have been described above in connection with specific embodiments, and particular modifications thereof, it is to be clearly understood that this description is made only by way of example and not as a limitation on the scope of the invention.

What is claimed is:

1. An electric pulse code modulator for the simple addition binary code comprising a periodically operating counting device arranged to build up a potential wave the amplitude of which changes progressively in discrete steps, said counting device comprising a chain of binary counting stages each operated by the previous one, and means for applying to the first stage a train of regularly repeated trigger pulses, means for comparing the potential wave with a signal wave potential, means for stopping the operation of the counting device when the difference of the two wave potentials has reached a specified value, and means for deriving from each counting stage a potential representing one binary digit of the total number of successive binary digits characterizing the signal wave amplitude at substantially the given instant when the difference of the two wave potentials has reached said specified value.

2. A modulator according to claim 1 in which the said regularly repeated trigger pulses are supplied to the first counting stage through a normally operated trigger gate circuit, comprising means for generating a stopping pulse when the said difference has reached the said specified value, and means for applying the stopping pulse to shut the gating circuit thereby stopping the operation of the counting device.

3. A modulator according to claim 2 comprising means for deriving a restoration pulse at the end of the complete counting period and means for applying the restoration pulse to restore all operated counting stages to normal after the counting has been stopped by the stopping pulses.

4. A modulator according to claim 3 comprising means for causing each operated counting stage to generate a corresponding code pulse on restoration to normal and means for delivering the code pulses in a given time sequence to a communication medium.

5. A modulator according to claim 4 in which the last mentioned means comprises a plurality of gating circuits, means for deriving a gating pulse from the said restoration pulse means for applying the gating pulse to the gating circuits so that each accepts a corresponding one of the code pulses, and means for delivering the code pulses after acceptance by the gating circuit to corresponding tappings of a delay network connected to the communication medium.

6. A modulator according to claim 3, comprising means for delaying the restoration pulse to produce a starting pulse for re-opening the trigger gate circuit.

7. A modulator according to claim 1 for a code of $m$ units, comprising $m$ binary counting stages each of which consists of a two-condition device and adapted to produce when operated an output-voltage proportional to $2^{r-1}$ where $r$ is the number of the stage in the series and takes all values from 1 to $m$, and means for adding together the output voltages of all operated stages.

8. A modulator according to claim 7 comprising means for combining with the said output voltage a voltage proportional to the signal amplitude, means for comparing the combined voltage with the fixed voltage of a comparison source, and means for generating a stopping pulse when the combined voltage reaches the said fixed voltage.

9. A transmitter for a multichannel pulse code modulation system of communication comprising a modulator according to claim 1, a signal gating arrangement adapted to apply the signals corresponding to the respective channels in turn to the modulator, each signal for one counting period of the counting device, and means for delivering to a communication medium a code group of pulses derived from the said potentials corresponding to each counting period of the counting device.

CHARLES WILLIAM EARP.
MALCOLM FRANK WINTLE.

REFERENCES CITED

The following references are of record in the file of this patent:

UNITED STATES PATENTS

| Number | Name | Date |
| --- | --- | --- |
| 2,449,467 | Goodall | Sept. 14, 1948 |
| 2,451,044 | Pierce | Oct. 12, 1948 |